May 13, 1924.
P. DORSEY ET AL
1,493,774
PRESSURE RELIEF VALVE
Filed Aug. 27, 1920
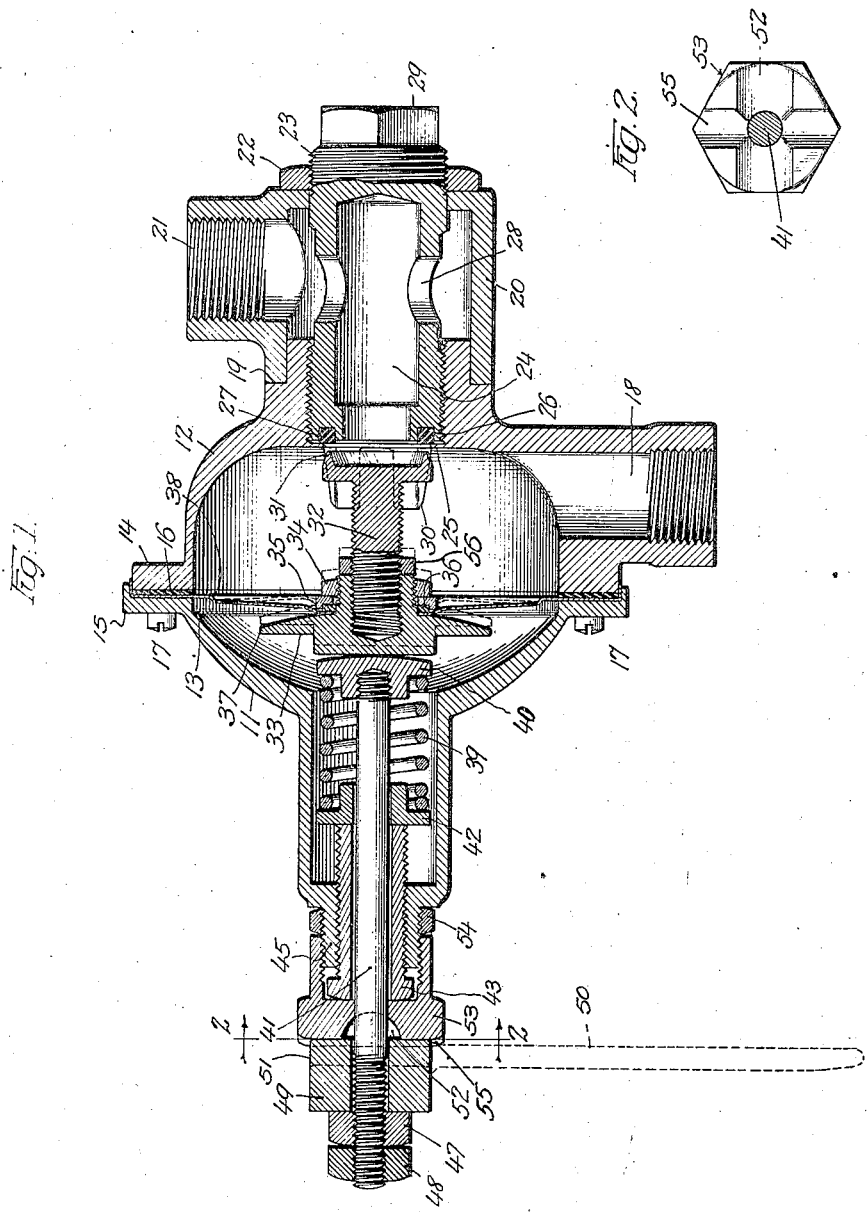
Inventors:
Parmer Dorsey
Robert O. McIntosh
by John Howard McElroy Atty.

Patented May 13, 1924.

1,493,774

UNITED STATES PATENT OFFICE.

PARMER DORSEY, OF WICHITA, KANSAS, AND ROBERT D. McINTOSH, OF CHICAGO, ILLINOIS, ASSIGNORS TO THE IMPERIAL BRASS MANUFACTURING COMPANY, OF CHICAGO, ILLINOIS, A CORPORATION OF ILLINOIS.

PRESSURE-RELIEF VALVE.

REISSUED

Application filed August 27, 1920. Serial No. 406,501.

*To all whom it may concern:*

Be it known that we, PARMER DORSEY and ROBERT D. McINTOSH, citizens of the United States, and residents, respectively, of Wichita, in the county of Sedgwick and State of Kansas, and of Chicago, in the county of Cook and State of Illinois, have invented certain new and useful Improvements in Pressure-Relief Valves, of which the following is a full, clear, and exact specification.

Our invention is concerned with pressure valves and more especially with saftey valves in which the valve is opened automatically and the pressure released in case it passes a certain point, and it is concerned primarily with such a valve having also a manual release for the spring pressure, so that every time it is operated manually to relieve the spring pressure the safety valve will be unseated, thereby insuring that it will not be stuck if it is ever called upon to function as a safety valve.

Our invention is further concerned with a pressure release valve whether operated manually or automatically in which the diaphragm itself is shaped so as to have a spring action that causes it to operate suddenly and open the valve widely as soon as the dangerous pressure is reached, or the manual operation has reached the open position, so that it will release the pressure suddenly, instead of slowly.

Our invention is further concerned with a pressure valve in which the valve seat is so located and held in the valve casing that it can be removed simply by screwing out a plug in which it is supported.

Our invention is further concerned with a valve of the class described in which one of the pipe openings is rotatably mounted relative to the other so that the inlet or outlet pipe can be set at any desired angle to the other without the use of any elbows or T's.

Our invention is further concerned with a manually operated valve having a diaphragm with a spring action associated therewith so that when the pressure is removed from one side of the diaphragm the spring action thereof will open the valve quickly to its wide open position to allow the pressure to fall rapidly.

Our invention is finally concerned with a pressure release valve so constructed that whenever the valve is opened it is positively lifted from its seat to prevent any possibility of its sticking.

To illustrate our invention, we have annexed hereto a sheet of drawings in which the same reference characters are used to designate identical parts in all the figures of which, Fig. 1 is a central longitudinal section through the valve with the handle turned so that the pressure is released; and Fig. 2 is a view in section on the line 2—2 of Fig. 1.

In carrying out our invention in its preferred form, we employ a valve casing consisting of two halves 11 and 12, each half being circular in cross-section throughout most of its length and the two castings having their adjacent ends hollowed out to form a chamber on each side of the diaphragm 13, which is clamped between the annular flange 14 carried by the portion 12 of the casing and the annular flange 15 carried by the other portion and preferably overhanging the same as shown, the two halves being clamped together with the periphery of the diaphragm 13 and the annular gasket 16 being clamped between them by the screws 17. The casing 12 is provided with the internally threaded inlet 18, preferably extending radially therefrom, and located concentrically on the casing is the annular seat or flange 19 on which is adjusted in any desired position the outlet sleeve 20 which has the threaded outlet aperture 21 on one side thereof, which aperture can be directed at any desired angle to the inlet 18 by simply turning the sleeve on its seat, where it is secured by the lock nut 22 co-operating with the threads 23 on the outer end of the hollow plug 24, the threaded inner end of which is screwed into the outlet passage formed in the casing 12 and which is preferably seated against the small annular flange 25 formed at the end of the passage 24. An annular channel 26 is formed in the inner end of the plug and has seated therein the annular rubber valve seat 27. The hollow cylindrical plug has the openings 28 in its sides so that the gas can pass out through ports 21 in any position of the plug, which has its outer end formed with the six flat surfaces 29, so that a wrench can be applied thereto. The inner face of the chamber in the casing 12 has formed thereon the four projections 30 which serve to guide the valve 31 to its seat 27, this valve preferably taking the form of a sharp flange on the edge of a disk secured on the valve stem 32 which is threaded into the center of the disk 33, a reduced central portion of which extends through the central opening in the diaphragm 13 to which it is secured by the lock nut 34 co-operating with the metallic washer 35, which in turn engages the packing ring 36 clamped against the diaphragm 13. The disk 33 has the large flange 37 with its face next to the diaphragm convex, as shown, so that when it is forced toward the valve seat, the diaphragm will be compelled to assume the position shown in dotted lines in Fig. 1, in which position, the diaphragm has been sprung past the central position by bending the same slightly at the annular offset 38, which is provided in the diaphragm for this purpose. With this construction of the diaphragm, it tends to remain either in the full line or the dotted line position shown in Fig. 1.

For the purpose of applying pressure to the outer face of the diaphragm, i. e., the one in the portion 11 of the casing, we preferably employ the helically coiled expanding spring 39 which is interposed between the flange disk 40 secured on the end of the rod 41 and the washer 42 loosely mounted on the rod, but held in any desired position of adjustment by means of the hollow adjusting bolt 43 which has an end to which a wrench can be applied and which is screwed through the internally and externally threaded reduced portion 45 of the cylindrical extension 46 of the portion 11 of the casing. By adjusting the bolt 43 to any desired position, it will be obvious that the tension of the spring 39 may be increased or diminished to furnish any desired pressure on the diaphragm 13.

The mechanism thus far described furnishes a safety release valve, but in order that the same may be released manually, we preferably provide the following mechanism: Threaded on the outer end of the rod 41 is a nut 47 held in place by a lock nut 48, the nut 47 forming an abutment against which the hub 49 of the handle 50 operates. The handle 50 has on the face of the hub a pair of diagonally opposed lugs 51 which are preferably substantially semi-circular in cross-section, and which are adapted to co-operate with the pair of diametrically opposed semi-circular recesses 52 formed in the end of the cap 53 which is screwed on to the extension 45 and is held against turning thereon by the lock nut 54. Also provided on the face of the cap 53 is a pair of diametrically opposed shallow recesses 55, which co-operate with the lugs 51 when the handle is turned to its open position to hold it in said position against accidental displacement. A lock nut 56 on the threaded stem 32 locks the valve 31 in its adjustment relative to the diaphragm 13.

The operation of the foregoing valve will be readily apparent. Assuming that the parts are in the position shown in dotted lines in Fig. 1, and that the pressure of the gas reaches the danger point. This pressure will lift the valve 31 against the pressure of the spring 39 without entirely freeing it from its seat until the diaphragm 13 has been moved past its center, at which time the spring action of the diaphragm serves to move it suddenly clear of the seat 27 and allows the valve to open wide and the gas to be released rapidly instead of sizzling in the manner in which the ordinary relief valve operates. When the handle is turned to the full line position shown in the drawings, the flange 41 is drawn away from the disk 33 quickly, and the pressure of the gas, now unopposed, moves the diaphragm from the dotted line position shown until it passes the center, after which the spring of the diaphragm throws it quickly to the full line position, opening the valve widely and securing a very quick release of the pressure.

While we have herein shown and described our generic invention in safety valves of this type, we do not herein claim the same generically, but only make such specific claims as cannot be made in our generic application No. 491,651, which we expect to have issued simultaneously herewith, and in which our invention is claimed generically.

While we have shown and described our invention as embodied in the form which we at present consider best adapted to carry out its purposes, it will be understood that it is capable of some modifications and that we do not desire to be limited in the interpretation of the following claims except as may be necessitated by the state of the prior art.

What we claim as new and desire to secure by Letters Patent of the United States is:

1. In a pressure operated release valve, the combination with a casing, of an elastic diaphragm covering a chamber in said casing, an inlet to said chamber, an outlet for the chamber associated with said casing, a valve seat in said outlet, a valve co-operating with the seat and connected to the diaphragm, a spring for applying pressure to the outside of the diaphragm, means for adjusting the tension of the spring, and a handle for drawing the spring from contact with the diaphragm so that the valve can open automatically by the elasticity of the diaphragm.

2. In a pressure operated release valve, the combination with a casing, of an elastic diaphragm covering a chamber in said casing, an inlet to said chamber, an outlet for the chamber associated with said casing, a valve seat in said outlet, a valve co-operating with the seat and connected to the diaphragm, a spring for applying pressure to the outside of the diaphragm, means for adjusting the tension of the spring, a handle for drawing the spring from contact with the diaphragm so that the valve can open automatically by the elasticity of the diaphragm, and detent mechanism for holding the handle in its closed position.

3. In a pressure operated release valve, the combination with a casing, of an elastic diaphragm covering a chamber in said casing, an inlet to said chamber, an outlet for the chamber associated with said casing, a valve seat in said outlet, a valve co-operating with the seat and connected to the diaphragm, means for applying pressure to the outside of the diaphragm without being positively connected thereto, and a handle for withdrawing said pressure so that the valve can open automatically by the elasticity of the diaphragm.

4. In a pressure operated release valve, the combination with a casing, of a diaphragm covering a chamber in said casing, an inlet to said chamber, an outlet for the chamber associated with said casing, a valve seat in said outlet, a valve co-operating with the seat and connected to the diaphragm, a rod having an enlarged end engaging the center of the diaphragm, a helically coiled expanding spring surrounding the rod, a washer engaging the other end of the spring, a cover cap screwed over the outer end of the bolt, said cap having a cam recess therein, and a handle loose on the end of the rod between the cap and an abutment on the outer end of the rod, and having a lug co-operating with the recess.

5. In a valve of the class described, the combination with a two part casing with an interposed diaphragm dividing it into two chambers, one part having a cylindrical extension concentric with the diaphragm and the other having radially arranged inlet and outlet ports, of a valve carried by the diaphragm, a seat for the valve carried by a member screwed into the outlet port of the casing, a helically coiled expanding spring in the extension, means for regulating the tension of the spring and its position relative to the diaphragm, a rod extending through the spring and having an enlarged head with which the inner end of the spring engages, and means for pulling out the rod.

6. In a valve of the class described, the combination with a two part casing with an interposed diaphragm dividing it into two chambers, one part having a cylindrical extension concentric with the diaphragm and the other having radially arranged inlet and outlet ports, of a valve carried by the diaphragm, a seat for the valve carried by a member screwed into the outlet port of the casing, a helically coiled expanding spring in the extension, means for regulating the tension of the spring and its position relative to the diaphragm, a rod extending through the spring and having an enlarged head with which the inner end of the spring engages, and means for pulling out the rod, consisting of an abutment on its outer end, a handle on the rod between the abutment and the casing, and cam mechanism between the handle and the casing to pull out the rod when the handle is turned.

In witness whereof, we have hereunto set our hands and affixed our seals, this 17th day of August, A. D. 1920.

PARMER DORSEY. [L. S.]
ROBERT D. McINTOSH. [L. S.]

Witnesses:
FRANK McNELLIS,
E. J. KNIGHT.